United States Patent
Grant

[15] 3,675,869
[45] July 11, 1972

[54] FILM RETAINING INSERT FOR REELS

[72] Inventor: Peter H. Grant, Lincolnwood, Ill.
[73] Assignee: Bell & Howell Company, Chicago, Ill.
[22] Filed: April 16, 1970
[21] Appl. No.: 29,204

[52] U.S. Cl. ............................................................242/74
[51] Int. Cl. ...................................................B65h 75/28
[58] Field of Search ......................242/74, 74.1, 74.2

[56] References Cited

UNITED STATES PATENTS

| | | | |
|---|---|---|---|
| 3,387,800 | 6/1968 | Hoag | 242/74.2 |
| 3,128,959 | 4/1964 | Pelson | 242/74 |
| 3,087,593 | 4/1963 | Kloski | 242/74 X |
| 2,954,941 | 10/1960 | Hultgren | 242/74 |
| 3,184,178 | 5/1965 | Bodge | 242/74 X |
| 2,948,487 | 8/1960 | Locklin | 242/74.2 |
| 1,118,689 | 11/1914 | Sharlow | 242/74.2 |

Primary Examiner—Stanley N. Gilreath
Assistant Examiner—Gregory A. Walters
Attorney—William F. Pinsak, John E. Peele, Jr., Kenneth W. Greb and William K. Serp

[57] ABSTRACT

A film retaining insert for reels comprises a unitary molded insert that is provided with either a slot or a slot and pin arrangement capable of anchoring the end of a strip of film to facilitate winding film from or onto the hub of the reel to which the insert is secured. The insert is shaped to fit within the space between the axis and the hub of the reel, and has an entry slot adapted to register with a threading slot extending transversely through the hub of the reel. The end of a strip film to be wound on the reel is threaded through the threading slot and into the entry slot of the insert, and then anchored thereto. The insert holds the film end firmly against accidental displacement from the reel, and thereby facilitates winding the film from or onto the hub of the reel.

4 Claims, 7 Drawing Figures

PATENTED JUL 11 1972  3,675,869

Inventor:
Peter H. Grant.

FILM RETAINING INSERT FOR REELS

This invention relates to a retainer for anchoring the core terminal end of a strip of film to be wound on or from a reel, and is particularly concerned with inserts that may be easily applied to any conventional reels. The structure of the present invention is capable of anchoring the core terminal portion of a strip of film to hold that film against accidental displacement from the reel at the start or end of film transport when the strip of film is wound on or from the hub of the reel.

The winding of film on reels has presented a problem because of the tendency of the core terminal portion of the strip of film to slip about the hub of the reel on which it is to be wound at the start of the rotational movement of the reel. The provision of a threading slot extending transversely through the hub of a reel, through which the film end can be threaded, has proved to be insufficient to hold the end of the film at the start of the rotational movement of the reel on which the film is to be wound. The pulling force exerted on the strip of film at the start of the rotational movement of the reel pulls the end of the film out of the threading slot, unless some positive means is provided for holding the film end until the overlapping of the succeeding film convolutions establishes sufficient frictional restraint to prevent relative sliding movement between adjacent convolutions.

The retention of the film end to the reel hub at the end of unwinding of the film has also presented a problem. This problem becomes more serious when automatic rewinding projectors are to be used since the rewind initiation system relies generally on tension caused by retention of the film end on the reel. That is, as the last film convolution is unwound, the film transport mechanism exerts a pulling force on the film attached to the reel, and unless the film end is retained positively to reel, insufficient film tension would be generated along the film path to cause actuation of the film rewind system.

In the past, two different methods have been used to anchor the film end to the reel on which it is to be wound. In one of these methods, the portion of the reel between its axis and its hub is constructed to provide a sinuous path for the core terminal or tail portion of the film with a plurality of snubber shoulders engaging the film. Another version of this method employs a film path of tear drop shape having a threading post extending transversely of the film path at substantially the center of the circularly arcuate portion of the tear drop shape. In each case, a reel of special construction is required, and neither is applicable to a conventional reel of standard construction.

One known structure for securing the film end to a conventional reel is described in the German Pat. No. 1,296,509. In this patent, the anchoring structure comprises an elastic locking piece that is inserted between the core terminal portion of the strip of film and the axis of the reel. In this structure, the locking piece is a separate member that cannot be applied to the reel until after the film end is threaded through the threading slot in the hub of the reel. In addition to the obvious disadvantage that it may be misplaced or lost, the locking piece has the additional disadvantage that in time it will lose its elasticity and will thus become ineffective for its intended purpose.

In the reel constructed in accordance with the present invention, a unitary molded retainer insert is merely snapped into place in the space between the hub and axis of a conventional reel on which the film is to be wound. The insert is held firmly in the position into which it is snapped, and has an entry slot adapted to securely hold the film end at the start or the finish of the rotational movement of the reel by means of which the strip of film is wound onto or from the hub of the reel. The entry slot of the insert registers with the threading slot of the reel so that the film end can be threaded through both slots and then anchored to the insert. In one embodiment of the invention, the insert is provided with a threading post adjacent its entry slot. In another embodiment, the insert of either of the above designs may be formed integrally with the reel, such as by molding.

Suitable structure by means of which the above mentioned and other advantages are attained will be apparent from the description of the accompanying drawings showing preferred embodiments of the invention in which like numerals refer to like parts.

Figure 1:
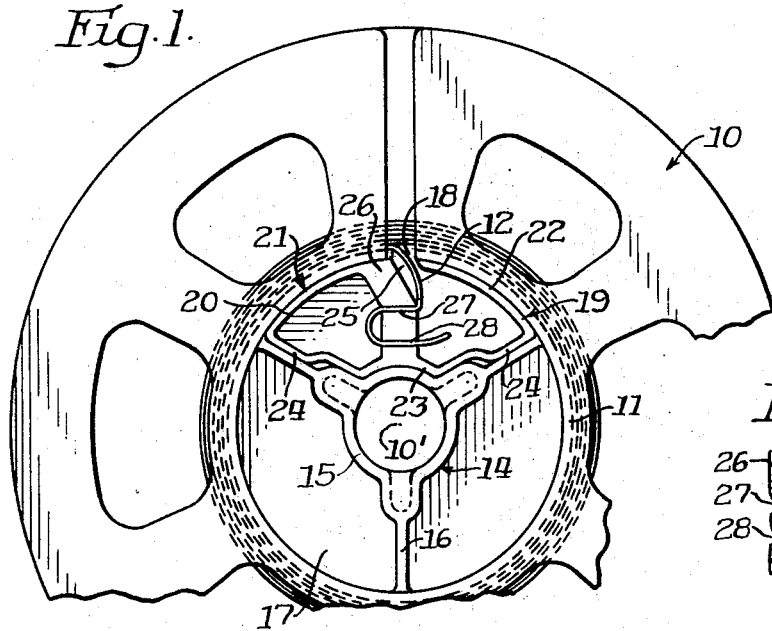
FIG. 1 is a fragmentary side elevation of a conventional film holding reel, with one form of a retainer, as an insert embodying the invention mounted in the space between the hub and the axis of the reel.

In the drawings, a film holding reel 10 of known construction, rotatably about an axis 10', comprises a hub 11 on which a strip of film 12 is wound, and flanges 13 between which the film is wound. A spider 14, positioned within the hub 11, comprises a substantially circular collar or spindle receiver 15 concentrically spaced from the hub, and three radially disposed spokes 16 that divide the space between the collar 15 and the hub 11 into three substantially equal segments 17. A threading slot 18, extending transversely through the hub 11, provides a passageway for the core terminal or end portion of a film. This film end is threaded through the slot and is then anchored to facilitate winding the film onto the hub of the reel, and to facilitate retention thereon upon unwinding of the film. The threading slot 18 is preferably located approximately midway of the length of one segment 17, but the specific location is not critical.

The retainer means for anchoring a film to the reel on which it is to be wound comprises a unitary molded plastic insert 19, shaped to conform to the shape of the segment 17 and dimensioned to fit snugly therein. The insert 19 is snapped into place in one of the segments and is held in place by frictional engagement. The insert is preferably formed with a flat plate 20 having a peripheral wall 21 extending from one side of the plate. The width of the wall 21 is approximately equal to the width of the strip of film that is to be wound on the reel. The wall 21 comprises two concentric arcuate sections 22 and 23 having their outer ends connected by two radially disposed sections 24. Arcuate section 22 engages the inner surface of hub 11 and is provided with a film entry slot 25 which is positionable in registration with the threading slot 18 of the hub when the retainer is assembled in the reel. Sections 24 extend radially inwardly from the outer or remote ends of section 22 and are shaped to engage the adjacent surfaces of two spokes 16 of spider 14. The inner or second arcuate section 23 engages the outer surface of collar 15 of spider 14.

Figure 2:
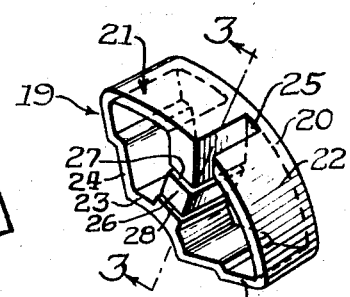
FIG. 2 is an enlarged perspective view of the retainer of FIG. 1.
Figure 3:
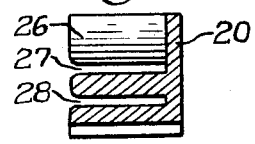
FIG. 3 is an enlarged cross sectional view taken along the line 3—3 of FIG. 2.

A gripping portion 26, extending from the same side of the flat plate 20 as the wall 21, extends transversely of the plate and connects the arcuate section 23 to the arcuate section 22 adjacent one edge of the entry slot 25. Preferably gripping portion 26 is of the same width as the wall 21, but is of greater thickness. In the embodiment of the invention illustrated in FIGS. 1 to 3, gripping portion 26 is provided with two slots 27 and 28 extending from the edge remote from the flat plate 20 and terminating adjacent the plate. The film end is threaded through the threading slot 18 of hub 11, the entry slot 25 of insert 19, and through both slots 27 and 28 with a reverse bend adjacent one end of the slots 27 and 28. The slots 27 and 28 have a depth only slightly greater than the thickness of the film and cooperate to securely anchor the core terminal portion of the film to the insert. The clamping action of the gripping portion on the film and the reverse bend of the film between the slots 27 and 28 causes frictional engagement of the film against the hub and prevents the film from pulling out of either slot as the rotational movement of the reel is started or stopped.

Much of the structure described above is duplicated in the other embodiments of the invention illustrated in FIGS. 4 to 7 of the drawings, and such structure will be identified by identical reference numerals. The description of such structure will not be repeated.

Figure 4:
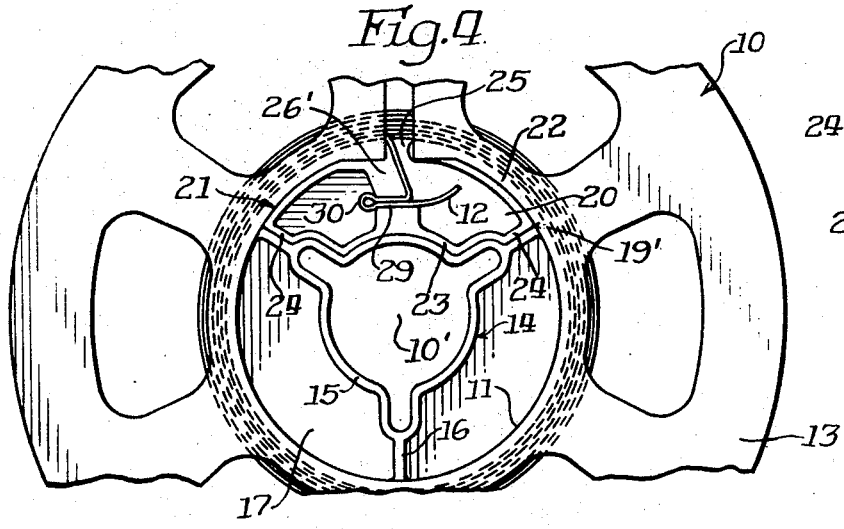
FIG. 4 is a view similar to FIG. 1 showing another preferred embodiment of the retainer.
Figure 5:
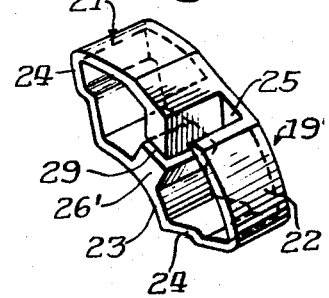
FIG. 5 is a perspective view of the retainer of FIG. 4.

In the embodiment of FIGS. 4 and 5, insert 19' differs from the insert 19 only in that gripping portion 26' has a single slot 29 instead of a pair of slots 27 and 28. The depth of the slot 29 is slightly greater than the depth of the slot 27 or 28 so that a double thickness of the film 12 may be threaded therethrough. The core terminal portion of the strip of film is threaded through the slot 29, and is then reversely bent and threaded through the slot in the opposite direction. A film loop 30 is formed on one side of the gripping portion by reversely bending the strip of film. This loop and film against film frictional engagement prevent the strip of film from being pulled out of slot 29 as the rotational movement of the reel is started or stopped.

Figure 6:
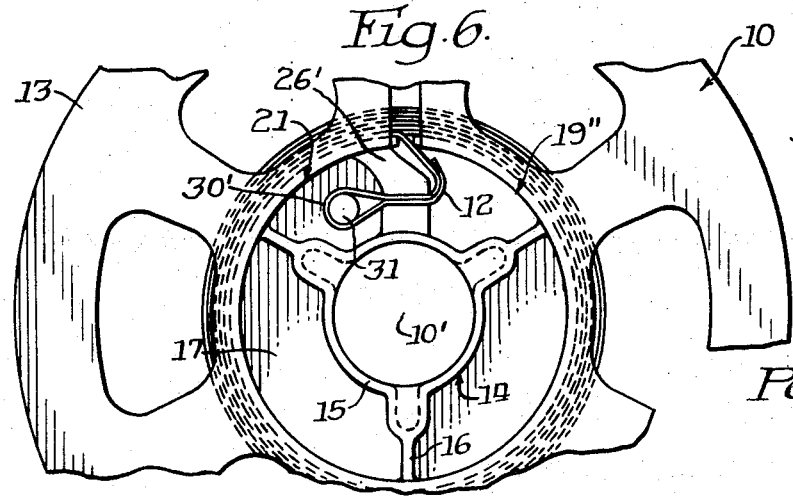
FIG. 6 is a view similar to FIG. 1 showing another preferred embodiment of the retainer.
Figure 7:
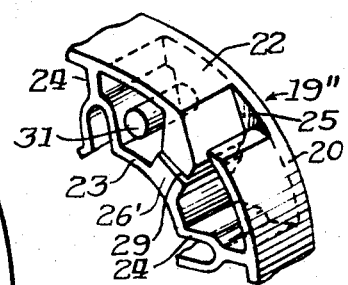
FIG. 7 is a perspective view of the retainer of FIG. 6.

As shown in FIGS. 6 and 7, although the retainer may be formed as an insert 19'' substantially identical to the insert 19', it may be of a construction having gripping portions 26' integral with hub 11 of reel 10. In either embodiment, a threading post 31 projects from the flat plate 20 in the space defined by the walls 24, and gripping portions 26' remote from the entry slot 25 or a spoke 16 and gripping portions 26'. The loop 30' of the end of film 12 is threaded around the post 31 for security additional to that caused by frictional retention of the film in slot 29.

Although I have described a few embodiments of the invention in considerable detail, it will be understood that the description is intended to be illustrative, rather than restrictive, as many details may be modified or changed without departing from the spirit or scope of the invention.

What is claimed is:

1. A molded film retaining insert and a film holding reel having a space between the reel axis and a reel hub, the insert comprising a flat plate and a peripheral wall integral with said flat plate, said peripheral wall extending perpendicularly from one side of said flat plate and having a configuration substantially conforming to the configuration of said reel space, whereby said insert fits snugly within said space and is held therein by frictional engagement with said reel, an entry slot extending through said peripheral wall for passage of the core terminal portion of a strip of film, and means integral with said flat plate for anchoring the core terminal portion of said strip of film to said insert.

2. A film retaining insert as recited in claim 1, wherein said means comprises gripping portions extending from said one side of said flat plate adjacent one edge of said entry slot and dividing the area defined by said peripheral wall into approximately equal portions, and slotted passageway means extending through said gripping portions to form a path for the core terminal portion of said strip of film, whereby the core terminal portion of said strip of film may be threaded through said passageway in opposite directions with a reverse bend in said strip of film adjacent one end of said passageway.

3. A film retaining insert as recited in claim 2, in which said slotted passageway means comprises a pair of slots spaced longitudinally of said gripping portions.

4. A film retaining insert as recited in claim 2, in which said gripping portion is provided with a slotted passageway of a depth sufficient to permit said core terminal portion of said strip of film to be threaded therethrough in opposite directions with a reversely bent loop adjacent one edge of said passageway to hold said strip of film against displacement therefrom.

* * * * *